United States Patent [19]
Ohlig

[11] Patent Number: 5,642,184
[45] Date of Patent: Jun. 24, 1997

[54] METHOD AND APPARATUS FOR VACUUM CONTACT PRINTING

[76] Inventor: Ernest Ohlig, 2306 Holiday Rd., Newport Beach, Calif. 92660

[21] Appl. No.: 547,393

[22] Filed: Oct. 24, 1995

[51] Int. Cl.$^6$ ................................................. G03B 27/20
[52] U.S. Cl. ........................... 355/91; 355/92; 355/87; 355/94
[58] Field of Search ........................... 355/76, 87, 91, 355/92, 93, 94, 132

[56] References Cited

U.S. PATENT DOCUMENTS

| | | | |
|---|---|---|---|
| 3,644,040 | 2/1972 | Beispel | 355/103 |
| 4,607,953 | 8/1986 | Farris | 355/91 |
| 4,620,787 | 11/1986 | Black et al. | 355/76 |
| 4,967,230 | 10/1990 | Meacham | 355/91 |
| 5,017,960 | 5/1991 | Tuulse | 355/91 |
| 5,255,052 | 10/1993 | Ternes et al. | 355/91 |
| 5,410,385 | 4/1995 | Ohlig | 355/91 |

Primary Examiner—Arthur T. Grimley
Assistant Examiner—Herbert V. Kerner
Attorney, Agent, or Firm—Tina M. Lessani; Albert C. Smith

[57] ABSTRACT

Apparatus and method for contact printing uses a vacuum contact plate and a screen frame to hold a master film sheet in contact registration with a screen having a region that is substantially porous to the passage of air disposed about a central photosensitive region. The vacuum contact plate receives the screen frame and supports the master film sheet and the screen on an elevated, substantially planar component. Air is evacuated from a hollow cavity within the elevated component to create a pressure differential across the master film sheet to urge the master film sheet in contact with the screen. If the master film sheet is not large enough to cover the entire porous region of the screen, the master film sheet is attached to a carrier sheet of sufficient size. The carrier sheet is then placed on the elevated component to be retained in contact registration with the photosensitive screen.

7 Claims, 7 Drawing Sheets

METHOD AND APPARATUS FOR VACUUM CONTACT PRINTING

RELATED REFERENCES

The subject matter of this application is related to the subject matter of U.S. Pat. No. 5,410,385 which is incorporated herein by this reference.

FIELD OF THE INVENTION

This invention relates generally to a contact exposure system, and more particularly to a method and apparatus for evacuating air between photographic sheets and retaining them in proper registration during exposure to a source of illumination.

BACKGROUND OF THE INVENTION

Conventional contact exposure systems commonly retain original photographic master and copy sheets in contact registration against a glass platen during exposure through the glass platen. Substantially uniform force may be exerted on the photosensitive materials to retain them in registration against the platen by laying an impervious vacuum blanket over the sheets and evacuating air from the region between the blanket and platen. One difficulty encountered with conventional systems of this type is that residual pockets of air may not be evacuated from between the photographic sheets, resulting in the sheets containing air bubbles and creases that distort the reproduced image. Although several schemes using glass platens have been devised to ensure more accurate evacuation of air from within the region between the photographic sheets, these schemes still have the disadvantages associated with using a glass platen, namely, significant intervals of vacuum pumping that slow down the throughput rate of photographic reproductions and potentially longer than necessary exposures times.

Schemes using a vacuum contact plate instead of a glass platen are known. FIG. 1 illustrates the underside of a screen frame 6 used in one known vacuum contact scheme. The screen frame 6 includes a rigid outer frame 8 that supports a woven mesh or screen 10 thereon in planar relationship with one face of the frame 6. A photosensitive material, such as a conventional photographic emulsion that becomes impervious or insoluble after exposure to ultraviolet radiation, coats the screen 10 in a selected area 12 (preferably on the rear side that faces out or up above the face of the frame 8) within the perimeter of frame 8. The coated area 12 is sized to leave at least about a one inch intermediate border of clear or uncoated screen 14 on at least two sides of the screen 10 between the coated area 12 and the frame 8.

Referring now to the perspective view of FIG. 2 and the sectional view of FIG. 3, a known vacuum contact plate 18 includes an outer frame 20, a centrally-oriented screen support section 22 spaced inwardly from the outer frame 20, and a recessed area 24 located between the inner perimeter of the outer frame 20 and the screen support 22. The vacuum contact plate 18 receives a prepared screen frame of the type illustrated in FIG. 1 in inverted orientation with the frame 8 of the screen frame 6 disposed within the recessed area 24 and the screen 10 disposed over the central screen support 22. A master film 31 of sufficient size or a transparent cover sheet including the master film 31 is then placed above the screen 10, replacing the conventional glass platen. A vacuum port 26 communicates with the recessed area 24 to quickly evacuate air from the recessed area 24 and from space between the master film 31 and the screen 10. Vacuum contact plate schemes evacuate air from between photographic sheets at a significantly faster rate than glass platen schemes. The evacuation of air produces a pressure differential across the master film 31 and a resulting force which urges the master film 31 against the screen 10.

As shown in FIG. 4, a difficulty with the known vacuum plate 18 arises when the thickness of the frame 8 is less than the depth of the recessed area 24. In this case, pumping air out through the vacuum port 26 exerts a pull on the frame 8 if the frame is not shimmed up to a larger size. The pull creates stress on seam 34 and often results in separation between the screen 10 and the frame 8. Thus, although known vacuum plate schemes overcome many of the problems associated with glass platen schemes, they do not easily accommodate frames of various sizes, and a need exists for a vacuum contact plate system which provides more flexibility with respect to frame size.

SUMMARY OF THE INVENTION

The present invention provides a method and apparatus for holding a master film and a screen in contact registration. The present invention includes a vacuum contact plate having an elevated, substantially planar component surrounded by a recessed perimeter, wherein the recessed perimeter receives a frame attached to the screen. The elevated component supports the master film and the screen, which are held in contact by evacuating air from a hollow cavity within the elevated component. Because air is evacuated from the cavity within the elevated component instead of from the recessed perimeter in which the frame resides, the present invention easily accommodates frames of various sizes. Moreover, the elevated component can be removed and replaced with another elevated component to accommodate screens of various sizes.

DETAILED DESCRIPTION OF THE PREFERRED EMBODIMENT

Figure 5:
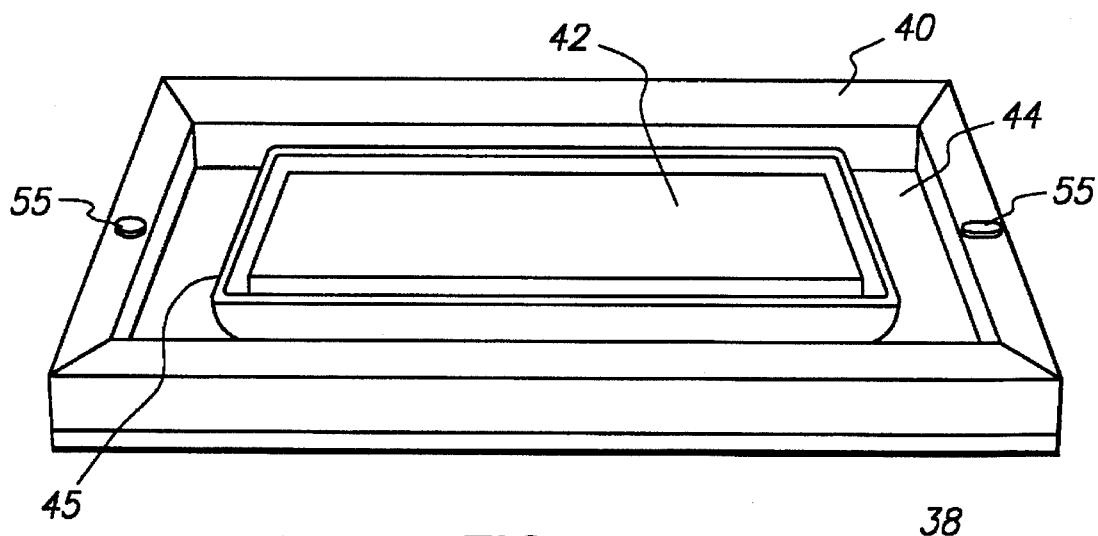
FIG. 5 is a perspective view of a vacuum contact frame according to the present invention.

FIG. 5 illustrate a perspective view of a vacuum contact plate 38 according to the present invention. The vacuum contact plate 38 includes an outer border 40 and a centrally-oriented, substantially planar screen support component 42 spaced inwardly from the outer border 40 and elevated to be level with the outer border 40. Additionally, a recessed perimeter 44 lies between the screen support 42 and the inner perimeter of the outer border 40.

Figure 1:
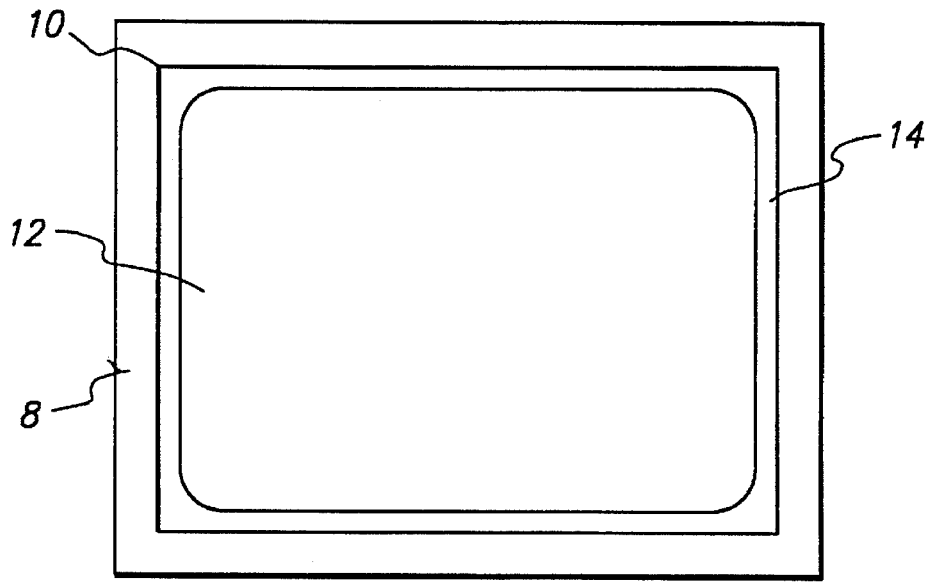
FIG. 1 is a plan view of the underside of a conventional screen frame prepared for exposure.
Figure 2:
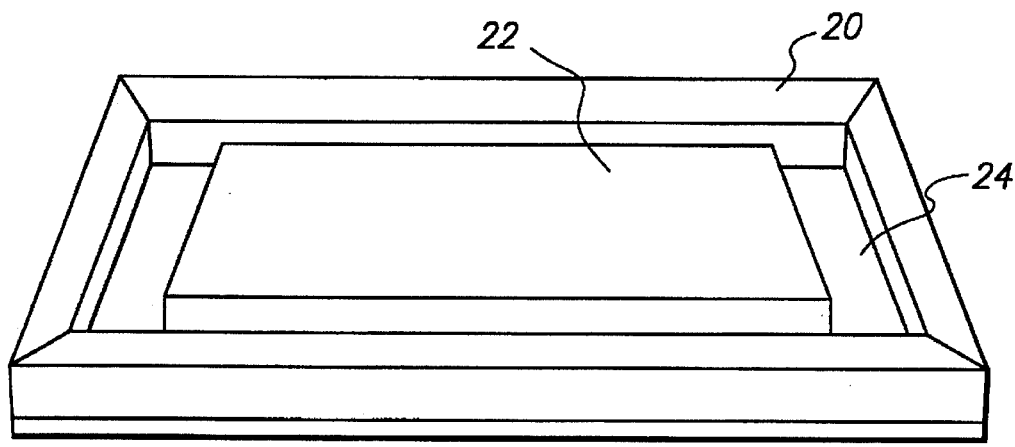
FIG. 2 is a perspective view of a known vacuum contact frame that retains a screen frame in proper registration during exposure.
Figure 3:
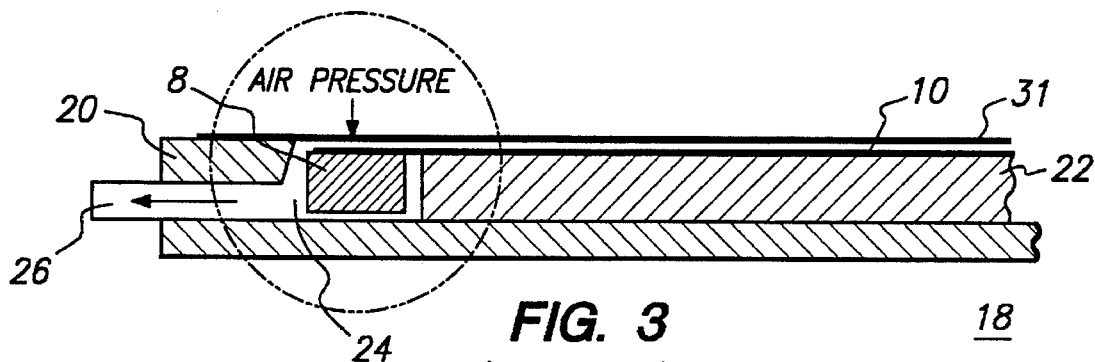
FIG. 3 is a sectional view of the known vacuum contact plate and the conventional screen frame and a master film sheet in registration position.
Figure 4:
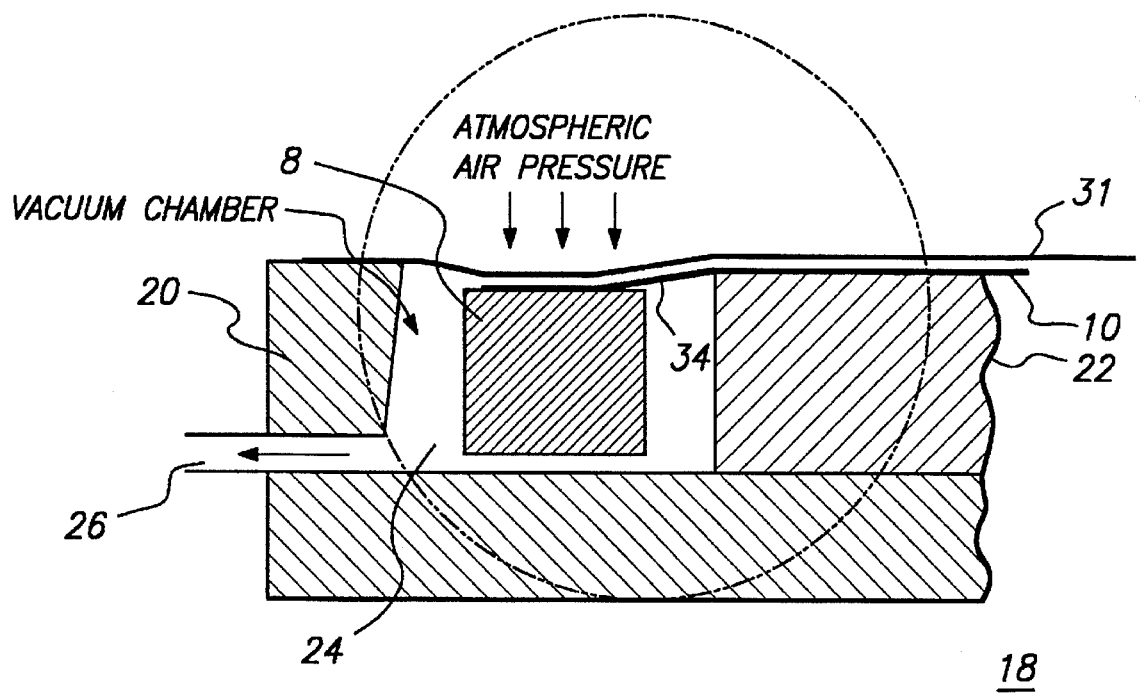
FIG. 4 is a sectional view of the known vacuum contact plate that illustrates a problem with such a structure.
Figure 6:
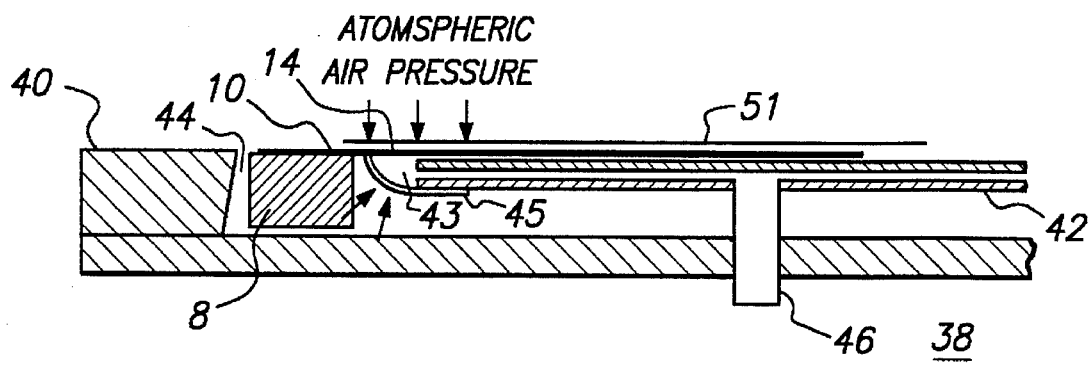
FIG. 6 is a sectional view of the vacuum contact frame of the present invention and a conventional screen frame and a master film sheet in registration position.
Figure 7:
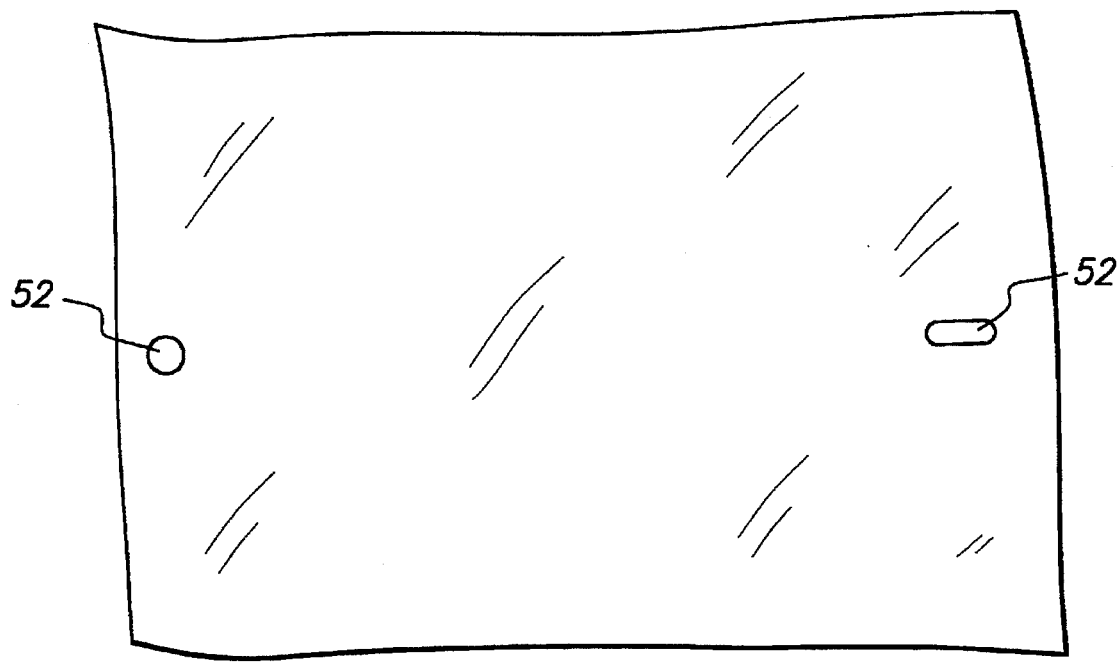
FIG. 7 is a plan view of one embodiment of a master film sheet.
Figure 8:
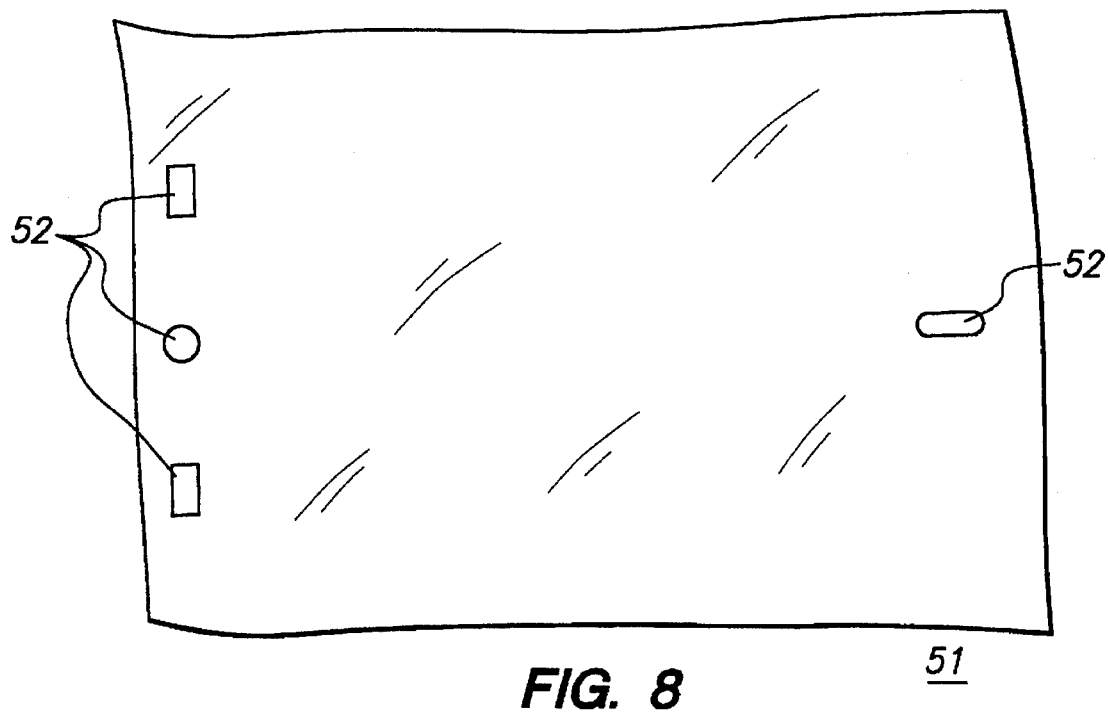
FIG. 8 is a plan view of one embodiment of a master film sheet.

As illustrated in the side sectional view of FIG. 6, the vacuum contact plate 38 receives a prepared screen frame of the type illustrated in FIG. 1 in inverted orientation. Specifically, the frame 8 of the screen frame 6 is placed in the recessed perimeter 44 and the screen 10 is disposed in a substantially planar orientation over the screen support 42. Once the screen frame 6 is inserted into the vacuum contact plate 38, a master image-bearing sheet or film 51 is placed over the screen 10 and covers all of the screen 10. To ensure that the master film 51 can be repeatedly placed on screen 10 in the same position, the master film 51 is registered to screen 10 using conventional methods. Specifically, as illustrated in FIG. 7, master film 51 includes holes 52 which are spaced to receive registration pins 55 located on the outer border 40. In FIG. 7, one of the holes 52 is round and the other is oblong, but those skilled in the art will appreciate that the holes 52 and the registration pins 55 can vary in size, shape, number and location. FIG. 8 illustrates another arrangement of holes 52, where the location of the registration pins 55 on the outer border 40 corresponds to the location of the holes 52 on master film 51.

Referring again to FIG. 6, after the master film 51 is placed on the screen 10, air is pumped out of a hollow cavity 43 within the screen support 42 in a conventional manner through a vacuum port 46. A granular or nodular mesh surface of the uncoated area 14 of the screen 10 permits residual volumes of air to be evacuate from space between the screen 10 and the master film 51 to produce a pressure differential across the master film 51, thereby creating a resultant force that urges the master film 51 into contact registration with the photosensitive coating 12 on the screen 10. Any residual air pockets remaining can be eliminated by rolling a squeegee or a roller across the master film 51.

Figure 9:
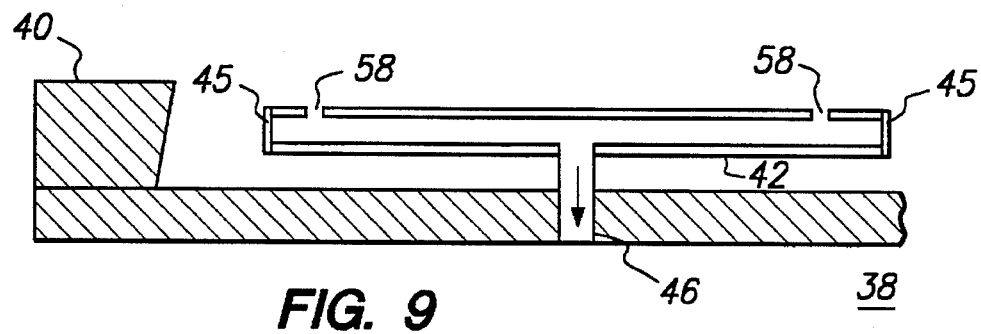
FIG. 9 is a sectional view of an alternate embodiment of the vacuum contact plate of the present invention.
Figure 10:
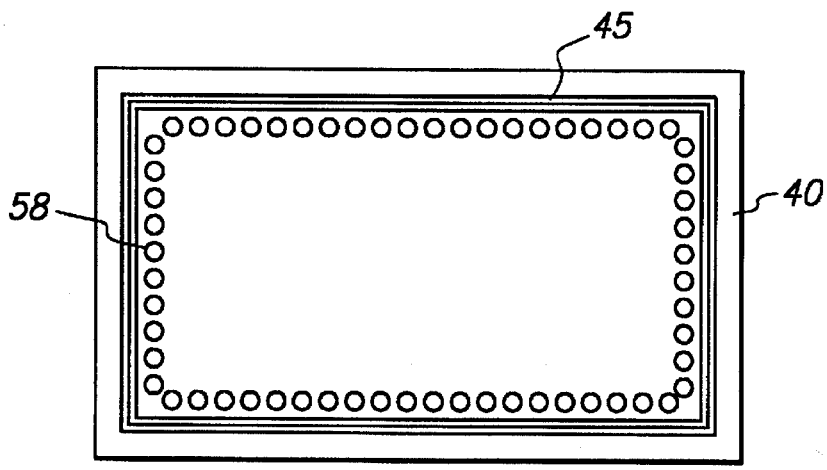
FIG. 10 is a plan view of an alternate embodiment of the vacuum contact plate of the present invention.

To facilitate vacuum draw, the screen support 42 has a rubber seal 45 attached to it. FIGS. 5 and 6 illustrate the rubber seal 45 fastened to the underside of all sides of the screen support 42 and bending upward to meet screen 10. In this embodiment, the rubber seal is rigid enough to support the screen 10 and form a vacuum seal therewith in response to the air being pumped out of the hollow cavity 43. The rubber seal 45 may also be fastened to the side, as illustrated in the sectional view of FIG. 9, or top of the screen support 42. In these embodiments, the screen support 42 contains holes 58, illustrated in FIGS. 9 and 10, from which vacuum is drawn when air is evacuated through the vacuum port 46.

Figure 11:
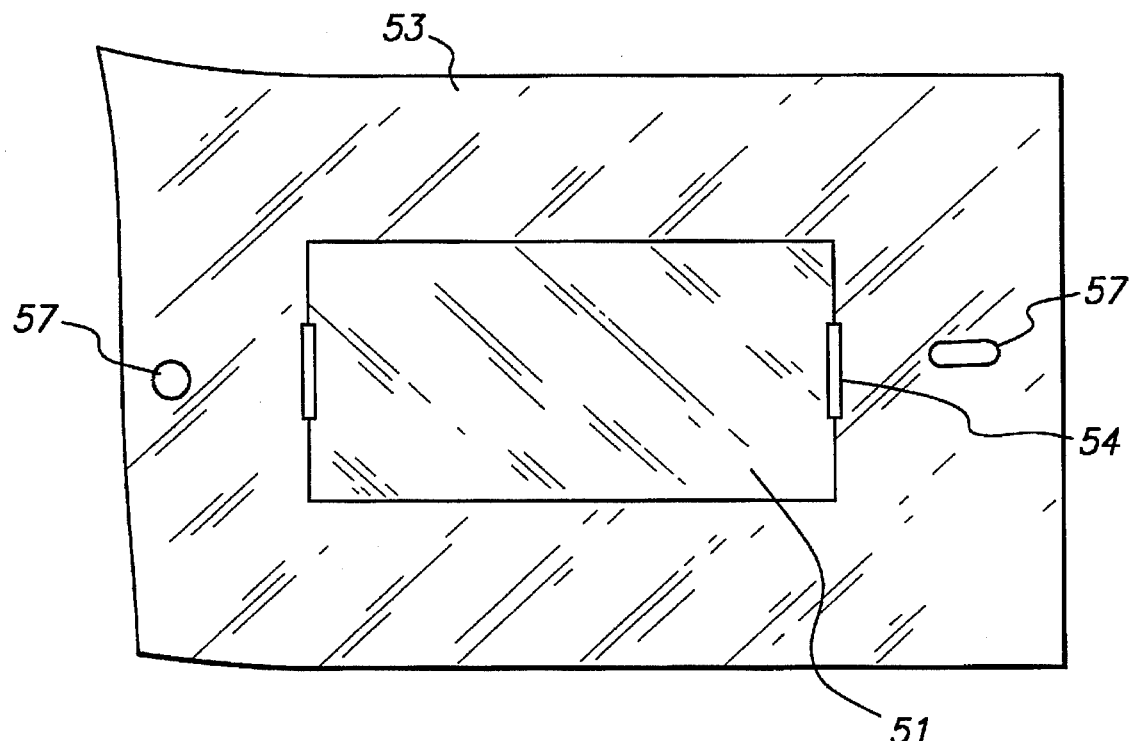
FIG. 11 is a plan view of a conventional prepared carrier sheet.
Figure 12:
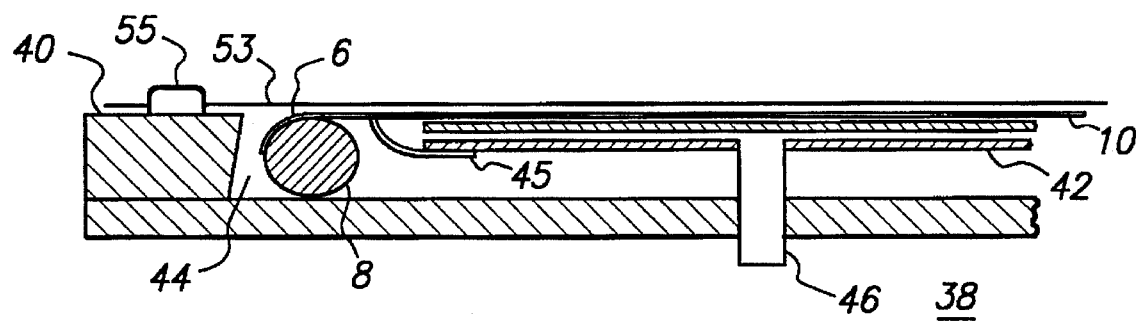
FIG. 12 is a sectional view of the vacuum contact frame of the present invention and the conventional screen frame and the carrier sheet in registration position.

Referring now to FIGS. 5, 11 and 12, when the master film 51 is not large enough to cover all of the screen 10, it is attached to a carrier sheet 53 with masking tape 54 in accordance with the method described in U.S. Pat. No. 5,410,385. The carrier sheet 53 is large enough to cover the screen 10 and reach two opposing sides of the outer border 40, and it has holes 57, one of which is round and the other of which is oblong, that are spaced to receive the register pins 55 located along the outer border 40. The holes 57 may also be arranged in the same manner as the holes 52 in FIG. 8 with the registration pins 55 placed in corresponding locations on the outer border 40. Thus, as illustrated in FIG. 12, the carrier sheet 53, including the master film 51, is placed on and aligned with the screen 10 using the register pins 55. Evacuating air through the vacuum port 46 in a conventional manner produces a pressure differential across the carrier sheet 53, which creates a resultant force that urges the carrier sheet 53 and the master film 51 into contact registration with the photosensitive coating 12 on the screen 10.

Figure 13:
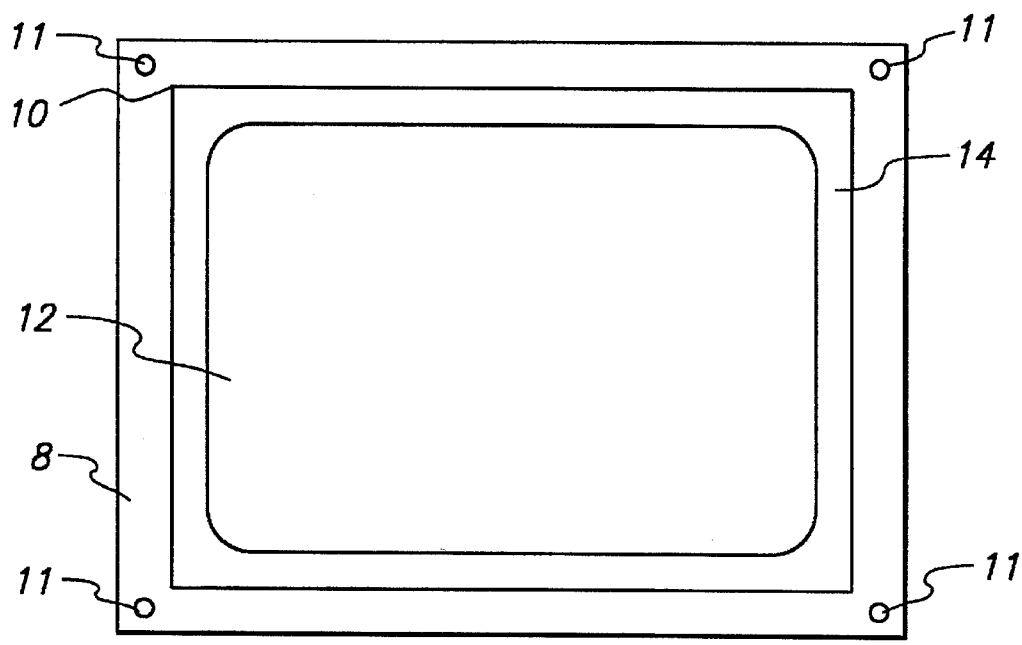
FIG. 13 is a perspective view of a known screen frame.
Figure 14:
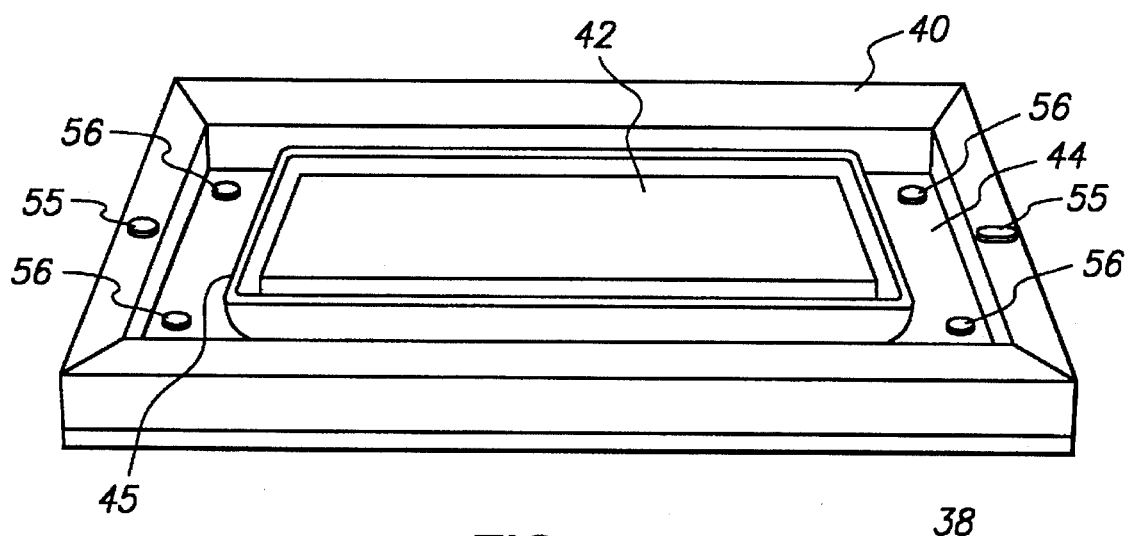
FIG. 14 is a perspective view of an alternate embodiment of the vacuum contact plate of the present invention.

In the above embodiment illustrated in FIG. 12, the screen frame 6 is equipped with conventional register devices that secure it to the vacuum contact plate 38. FIGS. 13 and 14 illustrate an example of such register devices, where registration holes 11 of the screen frame 6 receive registration pins 56 located in the recessed perimeter 44. These register devices retain the screen frame 6 in registration with the outer border 40. However, they do not register the screen frame 6 to the screen support 42, and screen frame 6 may be flexibly positioned with respect to the screen support 42.

Figure 15:
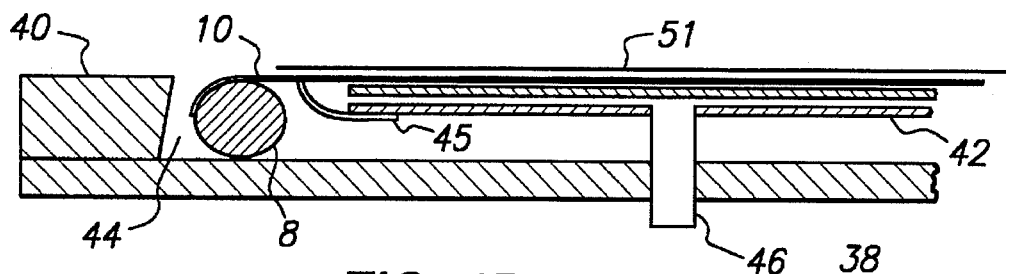
FIGS. 15 and 16 are sectional views of alternate screen frames disposed within the vacuum contact plate of the present invention.
Figure 16:
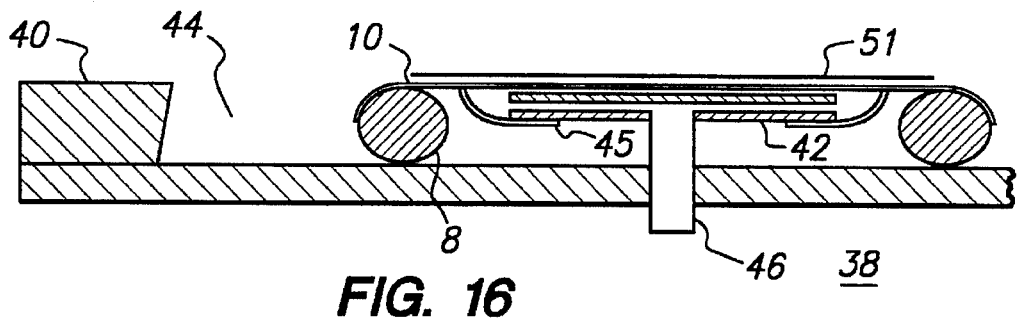

The screen support 42 can be easily removed and replaced with another screen support of a different size to fit other screen frames. FIG. 6 illustrates the vacuum contact plate 38 used with a screen frame having a frame with square or oblong members. FIG. 15 illustrates the vacuum contact plate 38 employed with a frame with round tension rods, and FIG. 16 illustrates use of the vacuum contact plate 38 with a frame and corresponding screen support that are smaller than those in FIG. 15.

Figure 17:
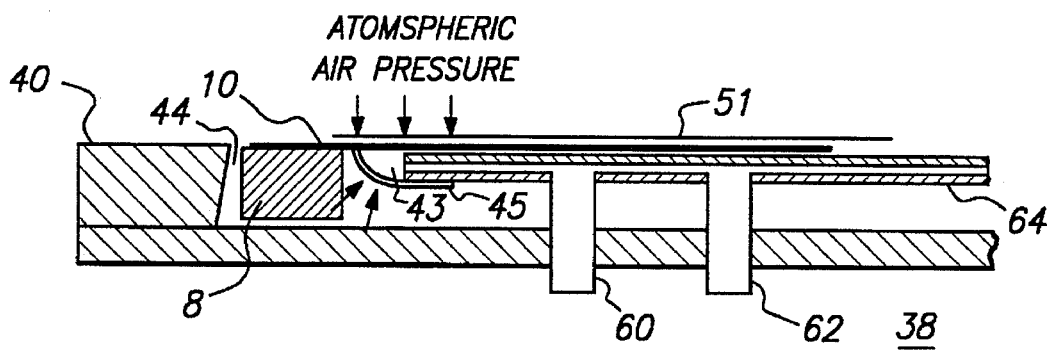
FIGS. 17 and 18 are sectional views of alternate embodiments of the vacuum contact plate according to the present invention.
Figure 18:
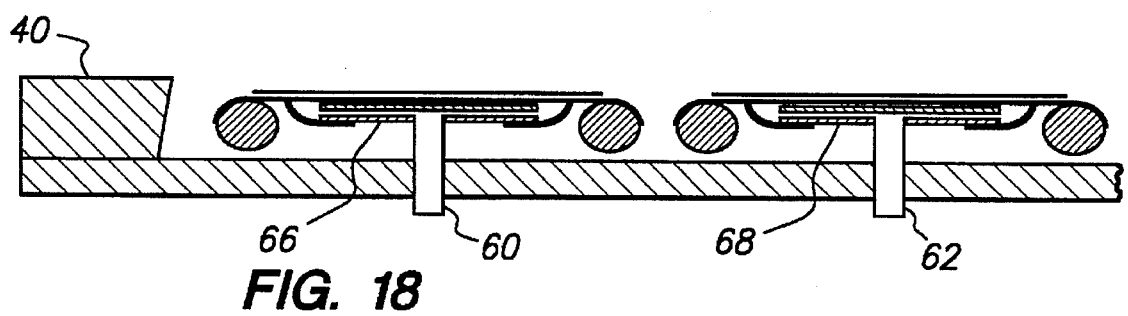

FIG. 17 illustrates another embodiment of the present invention in which the vacuum contact plate 38 has two vacuum ports 60, 62 to accommodate a large screen support 64. When the need for smaller screen supports arises, the large screen support 64 can be removed and replaced with two smaller screen supports 66, 68, as illustrated in FIG. 18. If the large screen support 64 is replaced with only one of the smaller screen supports 66, 68, then one vacuum port is capped. Those skilled in the art will appreciate that the vacuum contact plate illustrated in FIGS. 17 and 18 can contain more than two vacuum ports and two screen supports.

Multiple master films 31 and prepared screen frames 6 can be stored in the storage transfer rack described in U.S. Pat. No. 5,410,385. Similarly, the vacuum contact plate can be housed in the screen exposure unit described in U.S. Pat. No. 5,410,385.

Therefore, the apparatus and method of the present invention greatly facilitate the rapid contact exposure of prepared, variously sized screen frames and master films using lightweight components that obviate the conventional exposure platens and vacuum blankets associated with bulkiness, delays in exposure set-ups and accompanying expenses.

What is claimed is:

1. An apparatus for holding a master image-bearing sheet in contact with a layer of photosensitive material, the apparatus comprising:

an elevated, substantially planar component having a perimeter about a hollow cavity that supports the layer of photosensitive material and at least a portion of the master image-bearing sheet; and at least one vacuum port communicating with the elevated component for evacuating air from the hollow cavity and from space between the master image-bearing sheet and the layer of photosensitive material to retain the master image-bearing sheet in contact with the layer of photosensitive material.

2. The apparatus of claim 1, wherein the elevated component is removable and variable in size to accommodate layers of photosensitive materials of various sizes.

3. An apparatus for holding a master image-bearing sheet in contact with a layer of photosensitive material, the apparatus comprising:

a frame disposed about the layer of photosensitive material; and a contact plate including:

an elevated, substantially planar component having a perimeter about a hollow cavity that supports at least a portion of the master image-bearing sheet;

a recessed perimeter disposed about the elevated component for receiving the frame therein with the layer of photosensitive material supported by the elevated component; and at least one vacuum port communicating with the elevated component for evacuating air from the hollow cavity and from space between the master image-bearing sheet and the layer of photosensitive material to retain the master image-bearing sheet in contact with the layer of photosensitive material.

4. The apparatus of claim 3, wherein:

the contact plate further includes an outer border having at least one registration pin, the outer border disposed to surround the frame received within the recessed perimeter; and the master image-bearing sheet is attached to a carrier sheet having at least one registration hole for receiving the registration pin to align the carrier sheet with the layer of photosensitive material.

5. The apparatus of claim 3, wherein the elevated component is removable and variable in size to accommodate layers of photosensitive materials of various sizes.

6. A method of holding a master image-bearing sheet in contact with a screen having a region of photosensitive material, wherein a frame is disposed about the screen for positioning the screen on a substantially planar component having a hollow cavity, the method comprising the steps of:

attaching the frame to the screen at an orientation thereon which is spaced away from the photosensitive material to provide an intermediate border about the region of photosensitive material and within the frame that is substantially porous to passage of air;

supporting the screen on the substantially planar component having surface dimensions at least as large as the region of photosensitive material and a portion of the intermediate border combined;

receiving the frame within a recessed perimeter about the substantially planar component;

positioning the master image-bearing sheet on the screen to orient a master image at least within the region of photosensitive material; and evacuating air from the space between the master image bearing sheet and the screen by evacuating air through the screen and from the hollow cavity of the substantially planar component to retain the master film in contact with the screen.

7. An apparatus for holding a master image-bearing sheet in contact with a layer of photosensitive material, the apparatus comprising:

a planar component having a hollow cavity, the planar component disposed adjacent the layer of photosensitive material and the layer of photosensitive material disposed adjacent the master image-bearing sheet; and at least one vacuum port communicating with the planar component for evacuating air from the hollow cavity and from the space between the master image-bearing sheet and the layer of photosensitive material.

* * * * *